US008006128B2

(12) United States Patent
Olster (10) Patent No.: US 8,006,128 B2
(45) Date of Patent: Aug. 23, 2011

(54) PRIORITIZED REBUILDING OF A STORAGE DEVICE

(75) Inventor: Dan Olster, Woodland Hills, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 319 days.

(21) Appl. No.: 12/184,163

(22) Filed: Jul. 31, 2008

(65) Prior Publication Data
US 2010/0031082 A1 Feb. 4, 2010

(51) Int. Cl.
*G06F 11/00* (2006.01)
(52) U.S. Cl. ......................................................... 714/6.32
(58) Field of Classification Search .................. 714/6.32
See application file for complete search history.

(56) References Cited

U.S. PATENT DOCUMENTS

| | | | |
|---|---|---|---|
| 4,092,732 A | 5/1978 | Ouchi | |
| 4,761,785 A | 8/1988 | Clark et al. | |
| 5,208,813 A | 5/1993 | Stallmo | |
| 5,390,187 A | 2/1995 | Stallmo | |
| 5,872,906 A * | 2/1999 | Morita et al. | 714/6 |
| 6,154,853 A | 11/2000 | Kedem | |
| 6,282,670 B1 | 8/2001 | Islam et al. | |
| 6,442,659 B1 | 8/2002 | Blumenau | |
| 6,516,425 B1 | 2/2003 | Belhadj et al. | |
| 6,647,514 B1 | 11/2003 | Umberger et al. | |
| 6,732,233 B2 | 5/2004 | Smith | |
| 6,804,794 B1 | 10/2004 | Robidoux et al. | |
| 6,990,611 B2 | 1/2006 | Busser | |
| RE039,421 E | 12/2006 | Stolowitz | |
| 7,185,222 B2 | 2/2007 | Burton et al. | |
| 7,293,193 B2 | 11/2007 | Tanaka et al. | |
| 7,451,344 B1 * | 11/2008 | Rothberg | 714/5 |
| 7,490,270 B2 * | 2/2009 | Cherian | 714/42 |
| 7,577,866 B1 * | 8/2009 | Fan et al. | 714/6 |
| 7,631,218 B2 * | 12/2009 | Daikokuya et al. | 714/6 |
| 7,689,858 B2 * | 3/2010 | Koarashi | 714/5 |
| 7,739,544 B2 * | 6/2010 | Yamato et al. | 714/7 |
| 7,774,643 B2 | 8/2010 | Wang | |
| 2002/0095616 A1 | 7/2002 | Busser | |
| 2004/0153728 A1 | 8/2004 | Suzuki et al. | |
| 2005/0022051 A1 * | 1/2005 | Zane et al. | 714/6 |
| 2005/0050401 A1 | 3/2005 | Matsuki et al. | |
| 2005/0102552 A1 * | 5/2005 | Horn | 714/6 |
| 2005/0166084 A1 | 7/2005 | Yagisawa et al. | |
| 2006/0015767 A1 | 1/2006 | Sun Hsu et al. | |
| 2006/0041793 A1 * | 2/2006 | Cherian et al. | 714/47 |
| 2006/0112302 A1 * | 5/2006 | Cherian | 714/6 |
| 2007/0079170 A1 | 4/2007 | Zimmer et al. | |
| 2007/0101058 A1 * | 5/2007 | Kinnan et al. | 711/114 |

(Continued)

OTHER PUBLICATIONS

Celeros, RAID Whitepaper, Jan. 2007, pp. 1-4.

(Continued)

*Primary Examiner* — Bryce P Bonzo
(74) *Attorney, Agent, or Firm* — SoCal IP Law Group LLP; Mark A. Goldstein (57) ABSTRACT

Rebuilding a storage device after failure of a storage device is disclosed. The method is particularly useful for RAID groups of hard disks. The method may also apply to other storage media arranged as a group. The method includes rebuilding a hard disk in a non-linear fashion according to a heuristic analysis of logical units of the failed hard disk. The method may be implemented in hardware, firmware, software, or a combination thereof.

27 Claims, 4 Drawing Sheets

U.S. PATENT DOCUMENTS

| | | | |
|---|---|---|---|
| 2007/0159897 | A1 | 7/2007 | Wang |
| 2007/0174662 | A1 | 7/2007 | Zelikov et al. |
| 2007/0174674 | A1* | 7/2007 | Kanayama ............... 714/6 |
| 2008/0005614 | A1 | 1/2008 | Lubbers et al. |
| 2008/0126847 | A1* | 5/2008 | Koarashi ............... 714/6 |
| 2008/0178040 | A1 | 7/2008 | Kobayashi |
| 2008/0178041 | A1 | 7/2008 | Takahashi et al. |
| 2008/0313497 | A1 | 12/2008 | Hirakawa et al. |
| 2009/0006890 | A1 | 1/2009 | Takada et al. |
| 2009/0077416 | A1 | 3/2009 | D'Souza et al. |
| 2009/0259882 | A1 | 10/2009 | Shellamer |
| 2010/0050012 | A1 | 2/2010 | Nonaka et al. |

OTHER PUBLICATIONS

Chen et al, RAID: High-Performance, Reliable Secondary Storage, ACM Computing Surveys, vol. 26, No. 2, Jun. 2004, pp. 1-41.

Datadirect Networks, S2A Technology, High-Performance Storage for HPC, Sep. 2007, pp. 1-12.

Datadirect Networks, S2A Technology, Best Practices: Enterprise SATA Deployment with High Performance and Reliability, Dec. 2007, pp. 1-12.

EMC Corporation, EMC Clariion RAID 6 Technology, Jul. 2007, pp. 1-14.

MPSTOR, RAID 50 Interleave White Paper, Nov. 2006, pp. 1-13.

Berriman et al., RAID-DP: Dual-Parity RAID 6 Protection Without Compromise, NetApp Whitepaper, pp. 1-11.

Patterson et al., A Case for Redundant Arrays of Inexpensive Disks (RAID), Computer Science Division, Department of Electrical Engineering and Computer Sciences, pp. 1-26.

PIVOT3, Pivot3 RAIGE Storage Cluster, Technology Overview, Feb. 2007, pp. 1-18.

Storge Magazine, Best Storage Products of 2007, magazine, http://searchstorage.techtarget.com/magazinePrintFriendly/0,296905,sid5_gci1299110,00.html, accessed Apr. 22, 2008.

Winchestersystems, Technology Update White Paper "Enterprise RAID 6", May 4, 2006, pp. 1-14.

* cited by examiner

PRIORITIZED REBUILDING OF A STORAGE DEVICE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to hard disk drives and hard disks configured in an array such as a Redundant Array of Inexpensive Disks (RAID).

2. Description of the Related Art

Hard disk drives are ubiquitous in our society, included with or coupled to computers, configured as groups and coupled with servers, included in portable media players, and even included in automobile navigation systems. However reliable they are, hard drives occasionally fail. To increase the reliability, capacity, and performance of a hard disk, multiple hard disks may be used as a group. A popular configuration of a group of hard disks is known as RAID, an acronym for Redundant Arrays of Inexpensive (or Independent) Disks. The fundamental principle behind RAID is that it allows a collection of individual disks to behave as one larger, faster, and more reliable disk.

DETAILED DESCRIPTION

Environment

Figure 1:
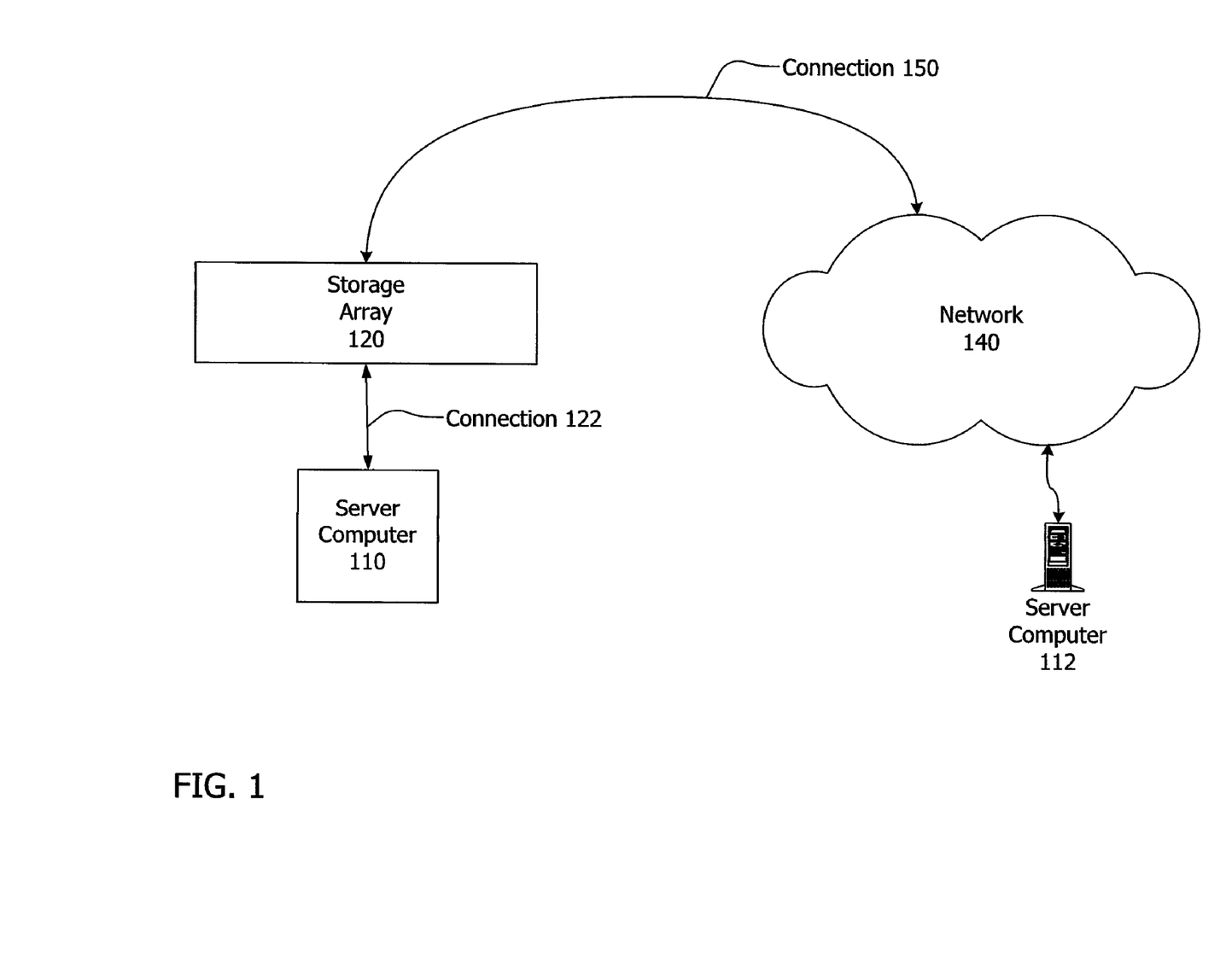
FIG. 1 is a block diagram of an environment in which prioritized rebuilding of a hard disk may be performed.

FIG. 1 is a block diagram of an environment in which prioritized rebuilding of a hard disk may be performed. Servers such as server computers 110 and 112 may provide access to data stored on a storage array 120. The servers may manage or otherwise control the storage devices included in a storage array. The servers may be directly coupled to one or more storage arrays such as storage array 120 over connection 122 or may be coupled over a network 140 to one or more storage arrays such as storage array 120 over connection 150.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated network, and may be a combination of these. Connections 122 and 150 may be wire lines, optical fiber cables, wireless communication connections, and others, and may be a combination of these.

Figure 2:
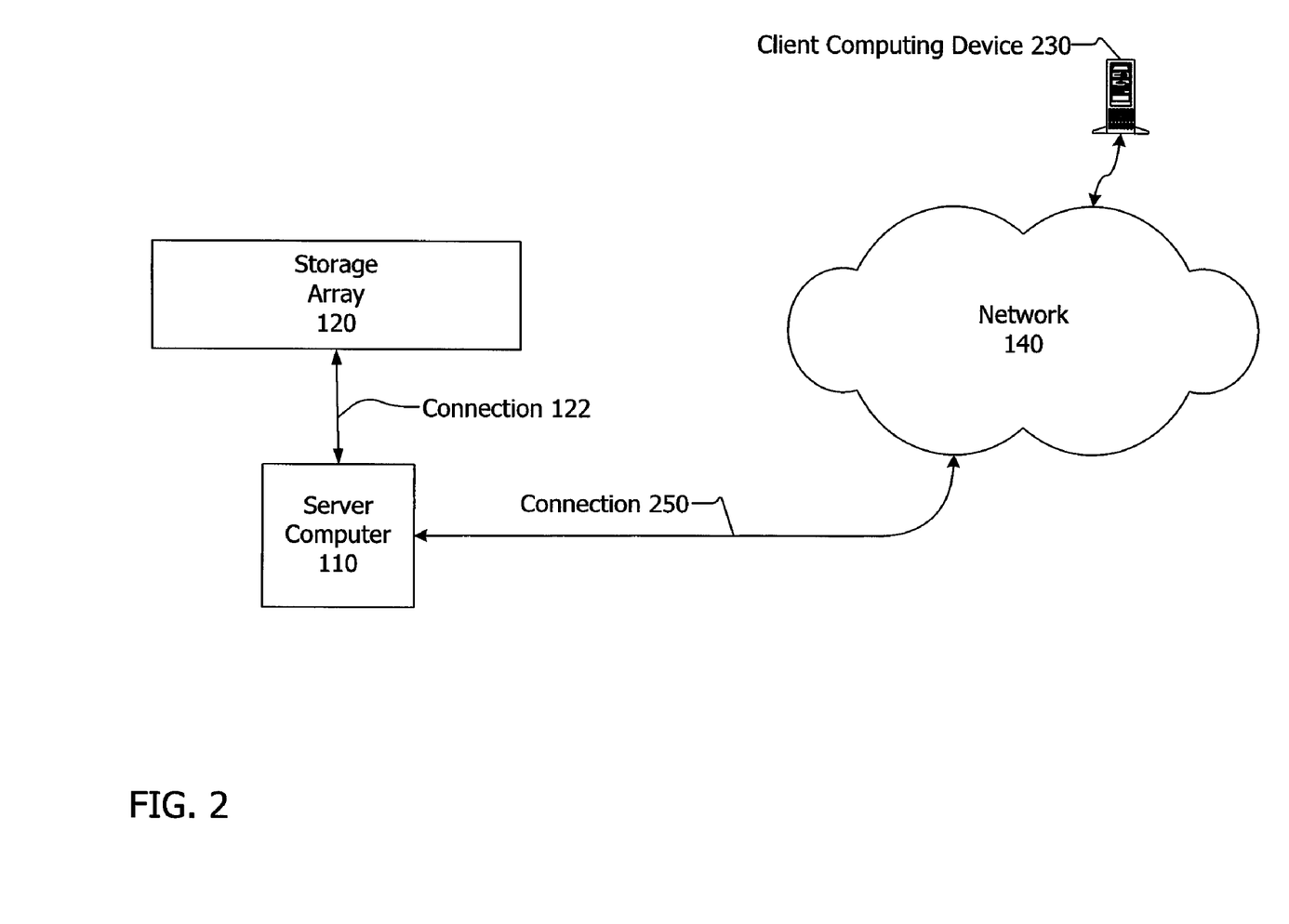
FIG. 2 is a block diagram of a second environment in which prioritized rebuilding of a hard disk may be performed.

FIG. 2 is a block diagram of a second environment in which prioritized rebuilding of a hard disk may be performed. Typically one more computing devices request data from a server. This may be in any of many scenarios, such as, requesting mail from a mail server, requesting data from a database server or running a database query, performing a banking transaction, viewing a photo album online, or requesting music from a music server or store. There are myriad examples. In all of these examples, a user on a client computer such as client computing device 230 makes a request for data over network 140 via connection 250 from a server such as server computing device 110 which is coupled with storage array 120 over connection 122.

The server computers 110 and 112 may be a specialized or general purpose computing devices. The server maybe any computing device that operates as a server. The server may be a specialized server, such as an application server, a video server, a graphics server, an advertisement server, a database server, or other server.

The functionality and features of the prioritized hard disk drive rebuilding described herein may be implemented in a controller (not shown) included internally in or externally coupled with a storage array, and may be implemented in a computing device such as a server computer 110 that is coupled with the storage array 120. A controller or server may implement the methods described herein on a single storage array or may concurrently implement the hard disk drive rebuilding technique on multiple storage arrays to achieved the prioritized hard disk rebuilding. A controller or server may manage or otherwise control the hard disk drives or other storage devices included in a storage array.

The functionality and features of the prioritized hard disk drive rebuilding systems and methods described herein may be implemented in a controller or server computer as software, hardware, or firmware, or a combination of two or more of software, hardware and firmware. A controller or server computer may include one or more of logic arrays, memories, analog circuits, digital circuits, software, firmware, and processors such as microprocessors, a field programmable gate arrays (FPGAs), application specific integrated circuits (ASICs), programmable logic device (PLDs) and programmable logic array (PLAs). The hardware and firmware components of the server computers 110 and 112 or controller may include various specialized units, circuits, software and interfaces for providing the functionality and features described herein. The processes, functionality and features may be embodied in whole or in part in software which operates on a controller or server computer and may be in the form of one or more of firmware, an application program, object code, machine code, an executable file, an applet, a COM object, a dynamic linked library (DLL), a script, one or more subroutines, or an operating system component or service, and other forms of software. The hardware and software and their functions may be distributed such that some components are performed by a controller or server, and others by other controllers or servers.

Although a server computer 110 is shown, the processes may be implemented with any computing device. Similarly, the client computing device 230 may be any network capable computing device.

A computing device as used herein refers to any device with a processor, memory and a storage device that may execute instructions such as software including, but not limited to, personal computers, server computers, computing tablets, set top boxes, video game systems, personal video recorders, telephones, personal digital assistants (PDAs), portable computers, and laptop computers. These computing devices may run an operating system, including, for example, versions of the Linux, Unix, MS-DOS, Microsoft Windows, Palm OS, Solaris, Symbian, and Apple Mac OS X operating systems. Computing devices may include a network interface in the form of a card, chip or chip set that allows for communication over a wired and/or wireless network. The network interface may allow for communications according to various protocols and standards, including, for example, versions of Ethernet, Infiniband® network, Fibre Channel, and others. A computing device with a network interface is network capable.

Figure 3:
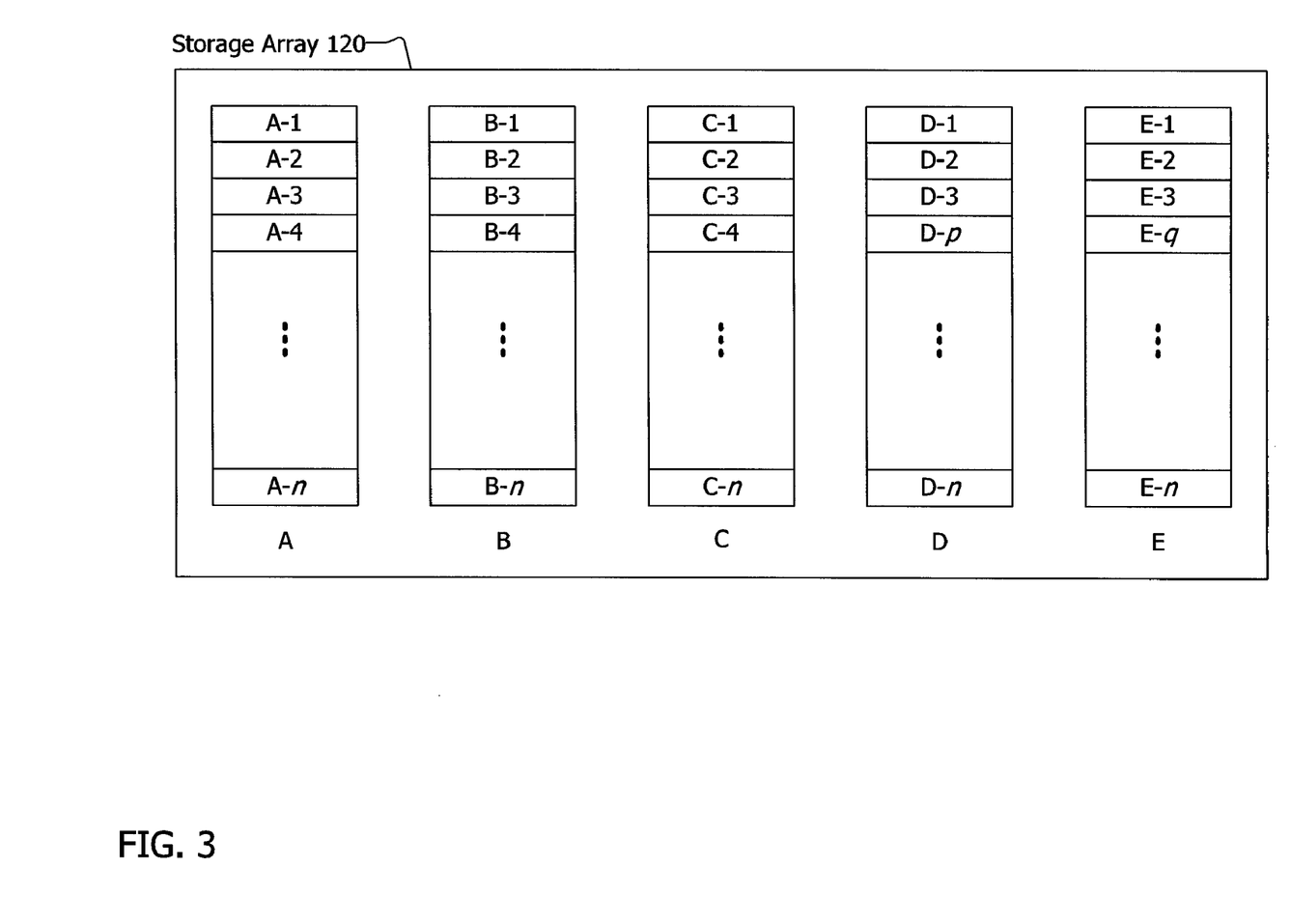
FIG. 3 is a block diagram of an example storage array.

Referring now to FIG. 3, a block diagram of an example storage array 120 is shown. The example storage array 120 may conform to RAID 6 and have five hard disk drives, namely disks A, B, C, D and E. The storage array 120 may include or be coupled with a controller, and the storage array 120 be include a network interface and/or a communications interface as defined herein. Each of the hard disk drives in the storage array 120 may be connected through a backplane or bus. The storage array 120 may be a networked attached storage (NAS) device or be part of a SAN.

To provide data reliably to the requesting servers and/or client computing devices, data may be stored as Redundant Arrays of Inexpensive (or Independent) Disks. There are various configurations of RAID storage, including RAID 0, RAID 1, RAID 10, RAID 0+1, RAID 1+0, RAID 2, RAID 3, RAID 4, RAID 5, RAID 5+1, RAID 5+0, RAID 53, X-RAID®, G-RAID®, EZRAID®, SYNCRAID® systems, and others. Hard disk drives may also be arranged according to other techniques as a group of disks that have a backup or redundancy feature. The term "storage array" is used herein to refer to any configuration of two or more hard disk drives having backup and/or redundancy features, including the various configurations of RAID storage.

The storage array 120 typically includes multiple hard disk drives. The hard disk drives included in an array may be of the same capacity, the same physical size, and conform to the same hard disk drive specification. Example sizes of hard disk drives include, but are not limited to, 2.5" and 3.5". Example hard disk drive capacities include, but are not limited to, 250 Mbytes, 500 Mbytes, and 1 terabyte. Example hard disk drive specifications include Serial Attached Small Computer System Interface (SAS), Serial Advanced Technology Attachment (SATA), and others. An example storage array may include six 3.5" hard disk drives having a capacity of 1 terabyte each and conforming to the SATA standard. In some embodiments, the physical size of the hard disk drives in a storage array may differ, and/or the hard disk drive specification of the hard disk drives in a storage array may not be uniform among all of the hard disk drives in an array.

The hard disk drives in a storage array may, but need not, be included in a single cabinet. When the hard disk drives in a storage array are included in a single cabinet, they may be coupled with a backplane. A controller may be included in the cabinet with the hard disk drives. The backplane may be coupled with or include the controller. The controller may communicate with and allow for communications with the hard disk drives according to the hard disk drive specification. The controller may include a processor, volatile memory and non-volatile memory. The controller may be a single computer chip such as an FPGA, ASIC, PLD and PLA.

The storage array 120 may include a communications interface that allows for connection to a computing device. The communications interface may allow for the transmission of and receipt of information according to one or more of a variety of standards, including, but not limited to, universal serial bus (USB), IEEE 1394 (also known as Firewire® and i.link®), WiFi (also known as IEEE 802.11), and others. The storage array may alternatively or additionally include a network interface card or device that allows for communication over a wired and/or wireless network. The controller included in or coupled with a storage array may alternatively or additionally include a network interface card or device that allows for communication over a wired and/or wireless network.

Although the techniques discussed herein are described with regard to a hard disk, the techniques may be implemented with other readable and writable storage devices arranged as a group. These storage devices include, for example, flash memory devices.

As used herein, a storage device is a device that allows for reading from and/or writing to a storage medium. Storage devices include hard disk drives, DVD drives, flash memory devices, and others. Storage media include magnetic media such as hard disks, flash memory, and optical disks such as CDs and DVDs.

The term data as used herein includes a bit, byte, word, block, stripe or other unit of information.

The storage array 120 may stripe data among all of the hard disk drives in logical units. The storage arrays described herein include storage devices that store data as logical units or LUNs. A LUN includes multiple bits, bytes, words, blocks and stripes. The size of a LUN may be user configurable, system configurable, or system defined, and may be static or variable, depending on the embodiment of the storage array. LUN size may be measured in, for example, bytes, megabytes, gigabytes, terabytes and blocks. In some embodiments, LUNs may be a few gigabytes in size or a few terabytes in size. Each LUN may be defined by the number of blocks it contains. Example LUN sizes include 128 blocks, 256 blocks, 1024 blocks, and others. Example block sizes include 512 bytes, 1024 bytes, 2048 bytes, 4096 bytes, and others.

Referring again to FIG. 3, each of the hard disk drives A, B, C, D, and E include multiple LUNs. Disk A includes LUNs A-1, A-2 through A-n, where n is the total number of logical units available for storage on the drive. This is the same for disks B, C, D, and E. In some embodiments, n, the total number of logical units available for storage, is the same for all hard disk drives in a storage array.

Depending on the storage strategy used in the storage array, data as well as information used to recreate a failed drive may be stored across the five drives according to a striped paradigm. Referring to FIG. 3, the RAID system may stripe data across the five drives such that LUNs A-4, B-4 and C-4 correspond to data in stripe 4 while D-p and E-q represent parity information for the data of stripe 4. The RAID techniques and striping methodology are well known in the hard disk storage field and are not described herein.

Description of Processes

Figure 4:
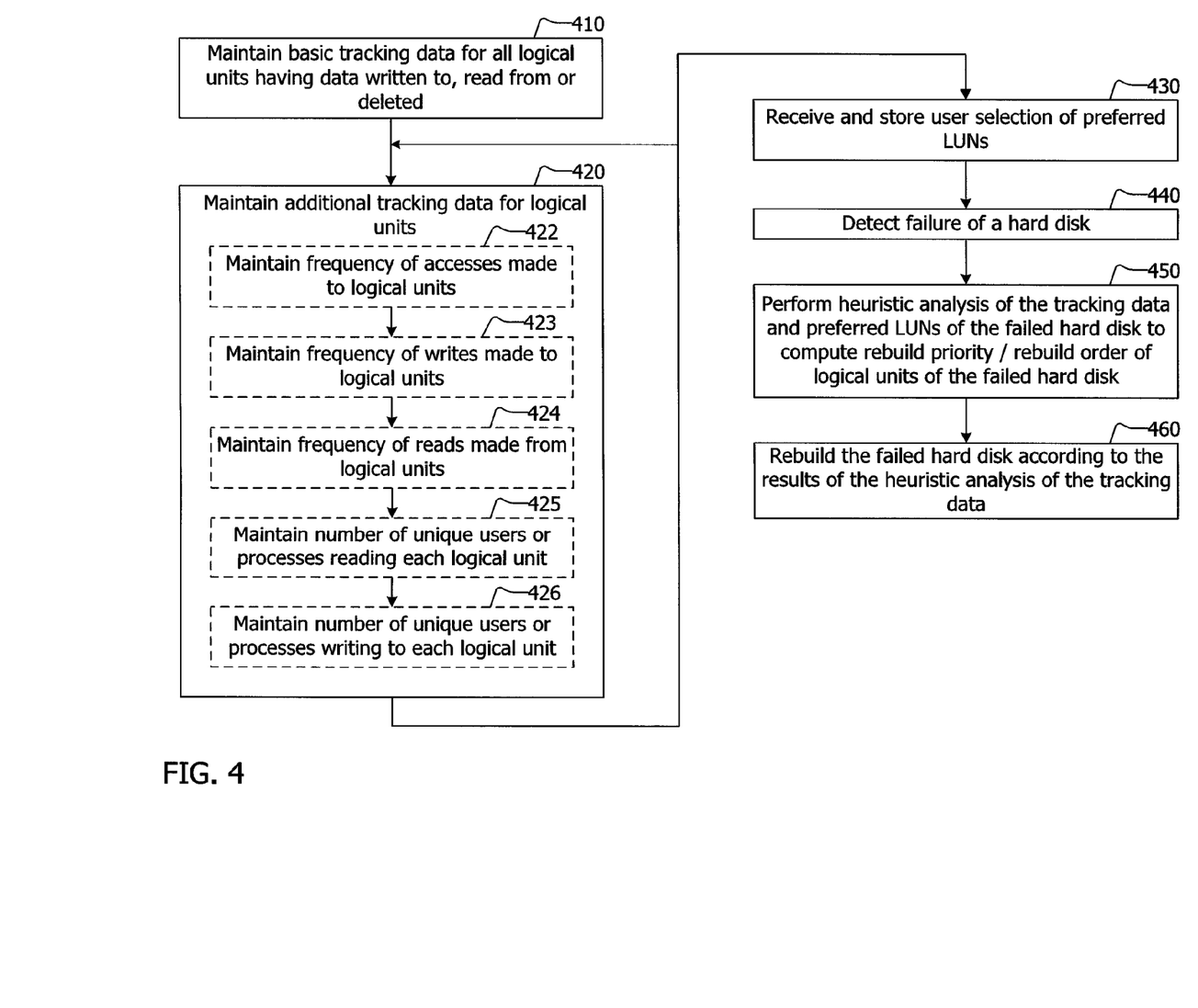
FIG. 4 is a flow chart of the actions taken to achieve prioritized rebuilding of a hard disk.

Referring now to FIG. 4, there is shown a flow chart of the actions taken to achieve prioritized rebuilding of a hard disk. As described herein, the method may be performed by a controller included in or coupled with a storage array or may be performed by a computing device such as a server computer coupled with a storage array. Data may be stored and accessed as blocks in the storage array. The blocks may further be arranged as LUNs. The size of the LUNS may be variable or static, and may be system defined or user defined.

Whenever data is written to, read from or deleted from the storage array, information about the LUNs and/or blocks having data written to, read from or deleted from them are maintained as basic tracking data, as shown in block 410. Information about all LUNs and/or blocks having data written to them may be stored in a table or other data structure. The table or other data structure used to store the basic tracking data may be maintained in a nonvolatile storage device such as an electronically erasable programmable read-only memory (EEPROM) or flash memory, or other storage medium included in the storage array or a controller coupled with or included in the storage array. The table or other data structure used to store the basic tracking data may be updated whenever data is written to, read from or deleted from a LUN and/or block in the storage array. The information stored as basic tracking data may include for each LUN and/or each block the time data is read from, written to or deleted from a particular block or LUN.

Additional tracking data may be maintained for logical units and/or blocks included in the storage array, as shown in block 420. The additional tracking data may be stored in one or more tables or other data structure in a nonvolatile storage device such as an EEPROM, flash memory or other storage medium included in the storage array or a controller coupled with or included in the storage array. The additional tracking data for a LUN and/or a block may be updated whenever data is written to or deleted from a LUN or block in the storage array, and whenever data in a block or LUN is read or otherwise accessed.

In various embodiments, the additional tracking data may be computed based on various activities that may be monitored or metrics that may be calculated regarding the LUNs. The additional tracking data should be sufficient to allow for a computation of the heuristic used to evaluate the priority of LUNs to be included in the rebuild of a failed hard disk. For example, the heuristic may be to prioritize, order, or rank the LUNs based on the most recently accessed, most recently written to, most recently read from, most often accessed, most often read from, most often written to, accessed by most users or processes, written to by most users or processes, read from by most users or processes, accessed by specific users or processes, written to by specific users or processes, read from by specific users or processes, combinations of these, and others.

Because the additional tracking data may be computed based on various metrics that may be monitored or calculated regarding the LUNs, blocks 422, 423, 424, 425 and 426 are examples of some of the additional tracking that may be calculated and maintained. One or more of the additional tracking data described in blocks 422, 423, 424, 425 and 426 may be maintained, and yet other additional tracking data may be maintained in addition to or in place of the tracking data described in blocks 422, 423, 424, 425 and 426.

The time frequency of accesses made to logical units may be maintained as additional tracking data, as shown in block 422. The frequency of writes made to logical units may be maintained as additional tracking data, as shown in block 423. The frequency of reads made from logical units may be maintained as additional tracking data, as shown in block 424. The frequencies described regarding blocks 422, 423 and 424 may be computed based on the basic tracking data. In various embodiments, the frequencies described regarding blocks 422, 423 and 424 may be calculated at run time/in real time as reads, writes, accesses are made; may be calculated when processing cycles or bandwidth is available on the controller or server; may be computed on a regularly scheduled basis; and may be computed after a disk has failed.

The number of unique users or processes reading each logical unit may be maintained as additional tracking data, as shown in block 425. The number of unique users or processes writing to each logical unit may be maintained as additional tracking data, as shown in block 426. The numbers of unique users or processes referred to in blocks 425 and 426 may be stored as a tally or sum total. The numbers of unique users or processes referred to in blocks 425 and 426 may include times of accesses, reads and writes made by particular users and processes. Processes, users and groups may be identified by any of a variety of techniques that allow for uniquely identifying the processes, users or groups, including numbers, letters, strings or combinations of numbers and letters, and others. Storing this information allows for computation of the LUNs most recently accessed, read from, or written to by a particular user, process or group of users or processes.

In one embodiment, a user selection of preferred LUNs and/or blocks may be received and stored along with the tracking data, as shown in block 430. The designation of a preferred LUN or block may be on a Boolean or binary scale, such that 0 is normal and 1 is preferred. The designation of a preferred LUN or block may be on another scale such as 0 through 9, 1 through 100, A through Z, and others, with, depending on the embodiment, the highest or greatest, or lowest or smallest, being most preferred, and the opposite being the least preferred.

When the failure of a hard disk in a storage array is detected, as shown in block 440, an heuristic analysis of the tracking data of the failed hard disk is performed to compute the rebuild priority or order of LUNs and/or blocks that were stored on the failed hard disk, as shown in block 450. The heuristic analysis may be limited to computations involving the basic tracking data and may include computations of and/or analysis of the additional tracking data. The heuristic analysis of block 450 may also include consideration of user specified preferred LUNs or blocks. That is, the rebuild priority may be based in part on which LUNs or blocks the user selected as preferred.

The failed hard disk may be rebuilt according to the heuristic analysis of the tracking data, as shown in block 460. The rebuilding may be performed by reconstructing the data from the failed hard disk on a replacement hard disk drive. In another embodiment, the rebuilding may be performed by reconstructing the data from the failed hard disk on the failed hard disk drive itself after error checking, reformatting and/or reconfiguration of the failed hard disk.

In another embodiment, certain data about the hard disk drives may be monitored to detect whether any hard disk drives in a storage array are likely to fail. The detection recited in block 440 may be, in this embodiment, detection of a soon to fail or likely to fail hard disk. The heuristic analysis and rebuild described regarding blocks 450 and 460 may also be applied to soon to fail or likely to fail hard disks.

The rebuild of the failed hard disk is performed in a non-linear fashion based on the results of the heuristic analysis, that is, according to the rebuild order. Multiple hard disk drives in an array may, in certain embodiments, be rebuilt concurrently. A goal is to rebuild the hard disk drive so that the most essential or critical data is preserved before less essential or relatively unimportant data. Another goal may be to rebuild the hard disk drive to provide the most needed data earlier than the less needed data. The heuristic analysis determines which data are more likely to be in demand, more critical to users or more essential or important than other data. The data most in demand, most critical to users, or essential may be given priority in the rebuild process. In various use environments, the heuristic used to determine which data is most in demand, most critical, or essential differs.

The priority of rebuilding and the rebuild order may be based on a heuristic determination of one or more of or a combination of one or more of: the most recently accessed LUNs, most recently written to LUNs, most recently read from LUNs, most often accessed LUNs, most often read from LUNs, most often written to LUNS, the LUNs accessed by most processes, the LUNs written to by most processes, the LUNs read from by most processes, the LUNs accessed by most users, the LUNs written to by most users, the LUNs read from most often by users, the LUNs accessed most by a specific process or processes, the LUNs read most by a specific process or processes, the LUNs written to most by a specific process or processes, the LUNs accessed most by a specific user or users, the LUNs read most by a specific user or users, and the LUNs written to most by a specific user or users.

The heuristic analysis of block 450 may rank the LUNs of the hard disk according to a scale and create a rebuild order. The ranking scale may be relatively small such as 0-5 or 1-10 or may be larger, such as 0-100 or 1-1000. The scale may be expressed in any usable format, such as, for example, whole numbers (for example, 1, 2, 3, etc.), decimal numerals (0.11, 0.22, 0.25, 0.33, 0.38, 0.40, etc.), letters (for example, A, B, C, etc.), and others. The ranking will determine the order or priority in which the LUNs in the failed hard disk are rebuilt, which is referred to herein as the rebuild order.

The LUNs on the failed hard disk which are determined by the heuristic analysis of the tracking data to be most needed are rebuilt first, followed by others. The rebuilding may be performed by reconstructing the data from the failed hard disk on a replacement hard disk drive or by reconstructing the data from the failed hard disk on the failed hard disk drive itself after error checking, reformatting and/or reconfiguration of the failed hard disk. The rebuilding may be achieved by referring to other drives in the storage array as is well known in the hard disk storage field, and, in particular, in the RAID field. The techniques used in rebuilding a hard disk are well known and are not described herein.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A method for rebuilding a replacement hard disk after the failure of a first hard disk included in a storage array, the method comprising:
    updating tracking data for each of the hard disks in the storage array whenever one of the hard disks in the storage array is read from, written to or accessed, the tracking data including one or more of information concerning time, frequency, processes and users;
    detecting that the first hard disk has failed;
    rebuilding the first hard disk on the replacement hard disk in a non-linear fashion according to a heuristic analysis of logical units of the first hard disk, wherein the rebuilding includes
        referring to the tracking data to order the logical units of the first hard disk according to the heuristic analysis,
        reconstructing the first hard disk on the replacement hard disk such that logical units are rebuilt according to the order set by the heuristic analysis.

2. The method of claim 1 wherein the tracking data is stored as one of a bitmap or table.

3. The method of claim 1 further comprising:
    receiving and storing a user selection of at least one preferred logical unit of the first hard disk; and
    wherein the heuristic analysis includes consideration of the preferred logical unit.

4. The method of claim 1 wherein the heuristic analysis includes prioritizing the logical units based on evaluation of one or more from the group comprising:
    most recently accessed,
    most recently written to,
    most recently read from,
    most often accessed,
    most often read from,
    most often written to,
    accessed by most processes,
    written to by most processes,
    read from by most processes,
    accessed by most users,
    written to by most users,
    read from by most users.

5. The method of claim 1 wherein the storage array is a Redundant Array of Inexpensive Disks (RAID) device.

6. The method of claim 1 wherein the tracking data includes one or more from the group comprising:
    a time of each write made to logical units of the first hard disk,
    a time of each read made from logical units of the first hard disk,
    a frequency of writes made to logical units of the first hard disk,
    a frequency of reads made from logical units of the first hard disk,
    a number of unique processes reading each logical unit of the first hard disk,
    a number of unique processes writing to each logical unit of the first hard disk,
    a number of unique users reading each logical unit of the first hard disk,
    a number of unique users writing to each logical unit.

7. A method to rebuild a failed hard disk drive in a Redundant Array of Inexpensive Disks (RAID) group, the method comprising:
    maintaining tracking data for all hard disks included the RAID group, the tracking data including information about logical units written to the hard disks, including one or more of information concerning time, frequency, processes and users;
detecting a failure of a first hard disk of the RAID group;
performing a heuristic analysis of the tracking data of the first hard disk to determine a rebuild order;
rebuilding the first hard disk in a non-linear fashion according to the rebuild order.

8. The method of claim 7 further comprising:
receiving and storing user selections of preferred logical units of the hard disks; and
wherein the heuristic analysis includes consideration of at least one preferred logical unit.

9. The method of claim 7 wherein the rebuilding is performed on a replacement hard disk drive.

10. The method of claim 7 wherein the heuristic analysis includes prioritizing the logical units based on evaluation of one or more from the group comprising:
most recently accessed,
most recently written to,
most recently read from,
most often accessed,
most often read from,
most often written to,
accessed by most processes,
written to by most processes,
read from by most processes,
accessed by most users,
written to by most users,
read from by most users.

11. The method of claim 7 wherein the tracking data includes one or more from the group comprising:
a time of each write made to logical units of the first hard disk,
a time of each read made from logical units of the first hard disk,
a frequency of writes made to logical units of the first hard disk,
a frequency of reads made from logical units of the first hard disk,
a number of unique processes reading each logical unit of the first hard disk,
a number of unique processes writing to each logical unit of the first hard disk,
a number of unique users reading each logical unit of the first hard disk,
a number of unique users writing to each logical unit.

12. A storage medium having instructions stored thereon which when executed by a processor cause the processor to perform actions to rebuild a replacement hard disk after the failure of a first hard disk included in a storage array, the actions comprising:
updating tracking data for each of the hard disks in the storage array whenever one of the hard disks in the storage array is read from, written to or accessed, the tracking data including one or more of information concerning time, frequency, processes and users;
detecting that the first hard disk has failed;
rebuilding the first hard disk on the replacement hard disk in a non-linear fashion according to a heuristic analysis of logical units of the first hard disk, wherein the rebuilding includes:
referring to the tracking data to order the logical units of the first hard disk according to the heuristic analysis,
reconstructing the first hard disk on the replacement hard disk such that logical units are rebuilt according to the order set by the heuristic analysis.

13. The storage medium of claim 12 wherein the tracking data is stored as one of a bitmap or table.

14. The storage medium of claim 12 having further instructions stored thereon which cause the processor to perform further actions comprising:
receiving and storing a user selection of at least one preferred logical unit of the first hard disk; and
wherein the heuristic analysis includes consideration of the preferred logical unit.

15. The storage medium of claim 12 wherein the heuristic analysis includes prioritizing the logical units based on evaluation of one or more from the group comprising:
most recently accessed,
most recently written to,
most recently read from,
most often accessed,
most often read from,
most often written to,
accessed by most processes,
written to by most processes,
read from by most processes,
accessed by most users,
written to by most users,
read from by most users.

16. The storage medium of claim 12 wherein the storage array is a Redundant Array of Inexpensive Disks (RAID) device.

17. The storage medium of claim 12 wherein the tracking data includes one or more from the group comprising:
a time of each write made to logical units of the first hard disk,
a time of each read made from logical units of the first hard disk,
a frequency of writes made to logical units of the first hard disk,
a frequency of reads made from logical units of the first hard disk,
a number of unique processes reading each logical unit of the first hard disk,
a number of unique processes writing to each logical unit of the first hard disk,
a number of unique users reading each logical unit of the first hard disk,
a number of unique users writing to each logical unit.

18. A storage medium having instructions stored thereon which when executed by a processor cause the processor to perform actions to rebuild a failed hard disk drive in a Redundant Array of Inexpensive Disks (RAID) group, the actions comprising:
maintaining tracking data for all hard disks included the RAID group, the tracking data including information about logical units written to the hard disks, including one or more of information concerning time, frequency, processes and users;
detecting a failure of a first hard disk of the RAID group;
performing a heuristic analysis of the tracking data of the first hard disk to determine a rebuild order;
rebuilding the first hard disk in a non-linear fashion according to the rebuild order.

19. The storage medium of claim 18 having further instructions stored thereon which cause the processor to perform further actions comprising:
receiving and storing user selections of preferred logical units of the hard disks; and
wherein the heuristic analysis includes consideration of at least one preferred logical unit.

20. The storage medium of claim 18 wherein the rebuilding is performed on a replacement hard disk drive.

21. The storage medium of claim 18 wherein the heuristic analysis includes prioritizing the logical units based on evaluation of one or more from the group comprising:
- most recently accessed,
- most recently written to,
- most recently read from,
- most often accessed,
- most often read from,
- most often written to,
- accessed by most processes,
- written to by most processes,
- read from by most processes,
- accessed by most users,
- written to by most users,
- read from by most users.

22. The storage medium of claim 18 wherein the tracking data includes one or more from the group comprising:
- a time of each write made to logical units of the first hard disk,
- a time of each read made from logical units of the first hard disk,
- a frequency of writes made to logical units of the first hard disk,
- a frequency of reads made from logical units of the first hard disk,
- a number of unique processes reading each logical unit of the first hard disk,
- a number of unique processes writing to each logical unit of the first hard disk,
- a number of unique users reading each logical unit of the first hard disk,
- a number of unique users writing to each logical unit.

23. A computing device to manage a storage array of hard disk drives arranged as a Redundant Array of Inexpensive Disks (RAID) group, the computing device comprising:
- a processor;
- a memory coupled with the processor;
- a storage medium having instructions stored thereon which when executed cause the computing device to perform actions to rebuild a failed hard disk drive in the storage array, the actions comprising:
    - maintaining tracking data for all hard disks in the RAID group, the tracking data including information about logical units written to the hard disks, including one or more of information concerning time, frequency, processes and users;
    - detecting a failure of a first hard disk of the RAID group;
    - performing a heuristic analysis of the tracking data of the first hard disk to determine a rebuild order;
    - rebuilding the first hard disk in a non-linear fashion according to the rebuild order.

24. The computing device of claim 23 wherein the storage medium has further instructions stored thereon which cause the computing to perform further actions comprising:
- receiving and storing user selections of preferred logical units of the hard disks; and
- wherein the heuristic analysis includes consideration of at least one preferred logical unit.

25. The computing device of claim 23 wherein the rebuilding is performed on a replacement hard disk drive.

26. The computing device of claim 23 wherein the heuristic analysis includes prioritizing the logical units based on evaluation of one or more from the group comprising:
- most recently accessed,
- most recently written to,
- most recently read from,
- most often accessed,
- most often read from,
- most often written to,
- accessed by most processes,
- written to by most processes,
- read from by most processes,
- accessed by most users,
- written to by most users,
- read from by most users.

27. The computing device of claim 23 wherein the tracking data includes one or more from the group comprising:
- a time of each write made to logical units of the first hard disk,
- a time of each read made from logical units of the first hard disk,
- a frequency of writes made to logical units of the first hard disk,
- a frequency of reads made from logical units of the first hard disk,
- a number of unique processes reading each logical unit of the first hard disk,
- a number of unique processes writing to each logical unit of the first hard disk,
- a number of unique users reading each logical unit of the first hard disk,
- a number of unique users writing to each logical unit.

\* \* \* \* \*